United States Patent [19]

van den Nieuwelaar et al.

[11] Patent Number: 5,178,890
[45] Date of Patent: Jan. 12, 1993

[54] METHOD FOR IMPROVING THE BACTERIOLOGICAL QUALITY OF SLAUGHTERED POULTRY

[75] Inventors: Adrianus J. van den Nieuwelaar, Gemert; Maurice E. T. Esbroeck, Nijmegen, both of Netherlands

[73] Assignee: Stork PMT B.V., Boxmeer, Netherlands

[21] Appl. No.: 547,962

[22] Filed: Jul. 5, 1990

[30] Foreign Application Priority Data

Jul. 6, 1989 [NL] Netherlands ............... 8901731

[51] Int. Cl.$^5$ ............... A22C 21/04; A23L 1/315
[52] U.S. Cl. ............... 426/332; 134/25.3; 134/30; 426/644; 452/173
[58] Field of Search ............... 422/1, 28; 426/532, 426/310, 332, 642, 644, 652, 54; 134/25.3, 28, 30; 452/173

[56] References Cited

U.S. PATENT DOCUMENTS

| | | | |
|---|---|---|---|
| 1,617,002 | 2/1927 | Zerbe | 452/173 |
| 2,866,998 | 1/1959 | Turner | 452/173 |
| 3,025,170 | 3/1962 | Murphy | 426/332 |
| 3,065,084 | 11/1962 | Melneck | 426/332 |
| 3,104,170 | 9/1963 | Mahon | 426/332 |
| 3,522,058 | 7/1970 | Libby | 99/107 |
| 3,689,958 | 9/1972 | Dillon | 452/173 |
| 4,045,579 | 8/1977 | Rogers | 426/332 |
| 4,667,370 | 5/1987 | Brockington et al. | 17/51 |
| 4,683,618 | 8/1987 | O'Brien | 452/173 |
| 4,770,884 | 9/1988 | Hill | 426/332 |
| 4,849,237 | 7/1989 | Hurst | 426/332 |
| 4,888,191 | 12/1989 | Anders | 426/332 |

FOREIGN PATENT DOCUMENTS

| | | |
|---|---|---|
| 0247803 | 5/1987 | European Pat. Off. |
| 2325328 | 9/1976 | France |
| 2534454 | 10/1982 | France |
| 6515802 | 6/1967 | Netherlands |
| 7201276 | 8/1973 | Netherlands |
| 7606477 | 6/1976 | Netherlands |
| 7704267 | 4/1977 | Netherlands |
| 8800549 | 3/1988 | Netherlands |
| 0840442 | 7/1960 | United Kingdom |

*Primary Examiner*—Carolyn Paden
*Attorney, Agent, or Firm*—Hurt, Richardson, Garner, Todd & Cadenhead

[57] ABSTRACT

A method for removing, killing or bringing into a passive condition of bacteria on and in the skin of slaughtered, plucked poultry by a chemical, mechanical and/or temperature treatment is disclosed, wherein the treatment(s) are effected after plucking of the poultry and prior to the opening of the carcass thereof. The skin of the poultry is preferably subjected to an acid treatment with an acid solution and a heat treatment at a temperature of about 50° C. for two to three minutes. The poultry can be immersed in or sprayed with water at the desired temperature, the water being mixed with an acid. Advantageously, the skin of the poultry is brushed with rotating brushing elements, at the same time spraying a spraying liquid on the poultry from above and from the sides.

37 Claims, 4 Drawing Sheets

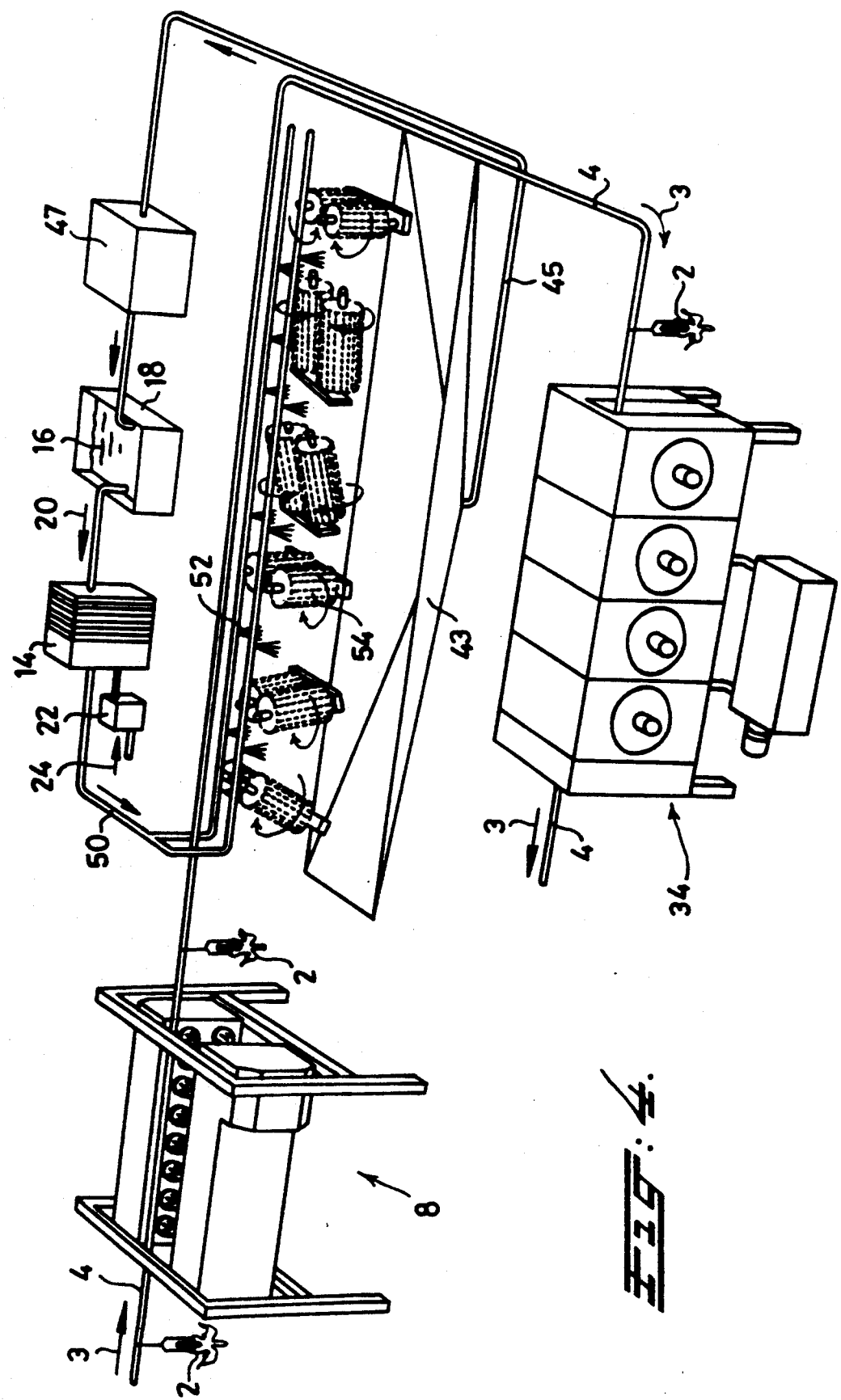

METHOD FOR IMPROVING THE BACTERIOLOGICAL QUALITY OF SLAUGHTERED POULTRY

BACKGROUND OF THE INVENTION

The invention relates to a method for removing, killing or bringing into a passive condition of bacteria on and in the skin of slaughtered, plucked poultry by a chemical, mechanical and/or temperature treatment. This invention also relates to a device for carrying out the method.

DISCUSSION OF THE PRIOR ART

In the slaughtering of poultry the following actions generally take place in succession: stunning, cutting the throat, followed by bleeding dry, scalding (immersing the poultry in hot water at about 50° for several minutes), plucking, opening up the carcass, eviscerating (removal of the entrails), and possibly jointing of the poultry into end products, such as fillets, drumsticks and the like.

During the above-mentioned operations the poultry must be contaminated as little as possible to obtain end products which can be stored a long time without unacceptable loss of quality. In particular certain parts of the skin are susceptable to contamination, which means that special attention should be paid to decontamination of the skin.

A major source of contamination of the skin, in particular by bacteria, is formed by the feathers of the poultry. The feathers are heavily soiled, partly as result of the transportation of the poultry from growing farm to slaughterhouse, tightly packed together in stacked crates, during which the poultry come into contact not only with droppings of other birds in the same crate, but also with droppings of birds in a crate higher up.

Although the feathers are removed by plucking the slaughtered birds, a large number of bacteria such as, for example, Salmonella, Campylobacter and Listeria (pathogenic bacteria, in other words, bacteria which can cause illnesses in human beings) and also Pseudomonas (bacteria which can adversely affect the quality, in particular the smell, of the meat) still remain on the skin of the birds.

Another important contamination of the skin is caused by the removal of the entrails out of the birds.

Different methods are known for decontamination of the poultry during scalding or plucking, or after evisceration has taken place. A disadvantage of the decontamination during scalding or plucking is the presence of the heavily soiled feathers containing many bacteria, which makes decontamination in this stage of the slaughtering process difficult. The same applies to decontamination after evisceration, because of the contact of the entrails with the skin.

SUMMARY OF THE INVENTION

The object of the invention is to reduce the number of bacteria growing on the end products of slaughtered poultry and retain the freshness of these products during a long period of storage.

This object is attained according to the invention in that the treatment(s) are effected after plucking of the poultry and prior to the opening of the carcass thereof.

By performing the decontamination after the plucking and prior to the opening of the carcass the skin is treated in an early stage when bacteria can be removed relatively easy because of a weak attachment to the skin, and the skin cannot be contaminated by bacteria coming from the inside of the poultry carcass.

The number of living bacteria is greatly reduced by subjecting the skin of the birds to an acid treatment and bringing it to a specific temperature for a specific period of time. This temperature cannot be selected at an arbitrary high level, since the quality of the meat would deteriorate as a result.

The acid and heat treatment preferably takes place at about 50° C. for two to three minutes.

The bacteria, many of which are killed by the heat treatment, are found not only on the skin, but also in the skin, for example in protecting pores. The heat treatment has to be accompanied by an acid treatment for killing the bacteria on and in the skin.

For a good and rapid heat transfer to the skin of the birds, they are preferably immersed in or sprayed with water at the desired temperature. The immersion can take place by, for example, immersing the birds within the set time in various baths separated from each other, in order to in this way prevent the large quantity of bacteria coming off the birds during the first immersion from still being present at the end of the immersion.

The subsequent immersion of many birds in the same bath will eventually lead to a heavy contamination of the bath, which is preferably avoided by periodically or continuously refreshing the contents of the bath.

Advantageously, the effect of the immersion can be enhanced by agitating the bath contents.

It is preferred to use lactic acid for the acid treatment, because this is an acid which occurs naturally in meat, so that any lactic acid absorbed in the meat will scarcely affect the taste of the meat. A particularly advantageous effect of the acid treatment is obtained if a solution of 5 $cm^3$ lactic acid per liter of water is used, which corresponds to a pH of approximately 2.3.

Another effective method for improving the bacteriological quality of slaughtered poultry involves brushing the skin of the poultry with rotating brushing elements to remove bacteria adhered to the skin, while at the same time spraying a spraying liquid on the poultry for washing off the released bacteria. The brushing elements are also at least partially cleaned by the spraying liquid, which may consist of water mixed with an acid.

During a brushing treatment much water is used. To save fresh water, the spraying liquid may be cleaned and recirculated after the treatment. The same applies to the liquid used in the baths for immersion of the birds.

It is also possible to combine two or more of the methods mentioned before to improve the results of the different treatments.

The methods according to the invention can be carried out in many ways. Advantageously, the slaughtered poultry hanging by the legs are conveyed under a conveyor line along the stations where the treatments take place. Every treatment should have a limited impact on the skin of the poultry to prevent recontamination during further processing and gain an attractive looking end product which can be stored a long time.

The claims and advantages will be more readily appreciated as the same becomes better understood by reference to the following detailed description and considered in connection with the accompanying drawings.

DESCRIPTION OF THE DRAWINGS

FIG. 4 shows a schematic perspective view of a second embodiment of a device for a brushing treatment.

DESCRIPTION OF THE PREFERRED EMBODIMENTS

Figure 1:
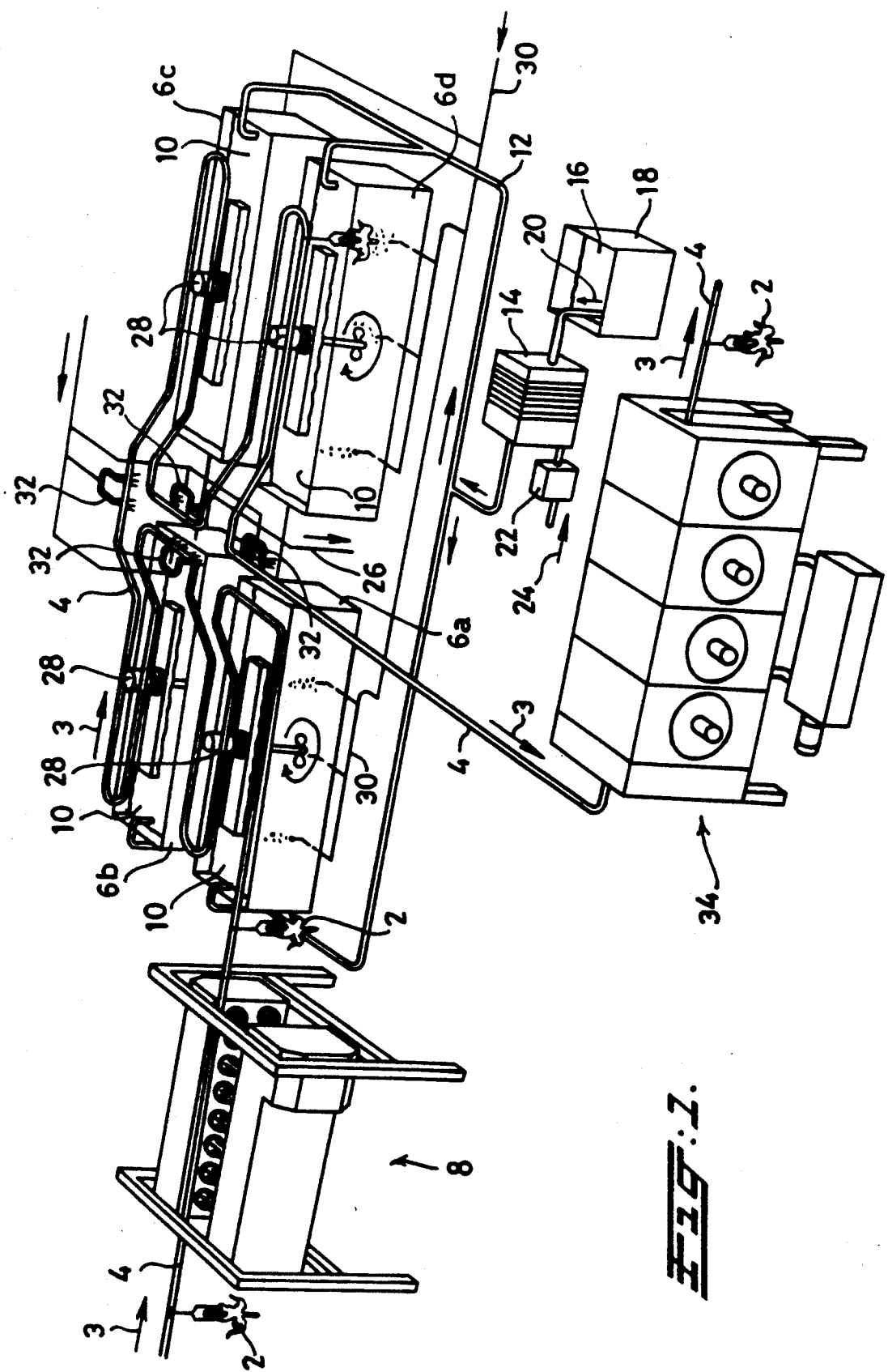
FIG. 1 shows a schematic perspective view of a first embodiment of a device for a washing treatment and a heat treatment of slaughtered poultry.

In FIG. 1 poultry 2, after passing a plucking device 8, is conveyed under a conveyor line 4 in the direction of arrow 3 through four baths 6a, 6b, 6c and 6d, respectively. The poultry by being conveyed along lower parts of the conveyor line 4 is immersed in subsequent baths 6a, 6b, 6c and 6d.

The baths contain an acid solution 10 which is supplied to the baths through a pipeline system 12 from a conditioning unit 14, in which water and acid can be mixed to reach a certain pH and can be brought to a certain temperature, e.g. heated up to about 50° C.

The supply of water 16 from a buffer tank 18 is indicated with arrow 20, whereas the supply of acid through a pH controlling device 22 is indicated by arrow 24.

Contaminated water is drained from the baths through a pipeline system 26 and can, after cleaning, be recirculated to buffer tank 18.

The acid solution 10 in the baths 6a-6d is agitated by agitators 28 and by injection of air by means of a pipeline system 30.

After passing each bath the remains of the acid solution on the skin of the poultry are washed off by spraying with clean water through spraying nozzles 32.

After immersion of the poultry in the last bath 6d the poultry is conveyed through a cooling unit 34 and is processed further.

Figure 2:
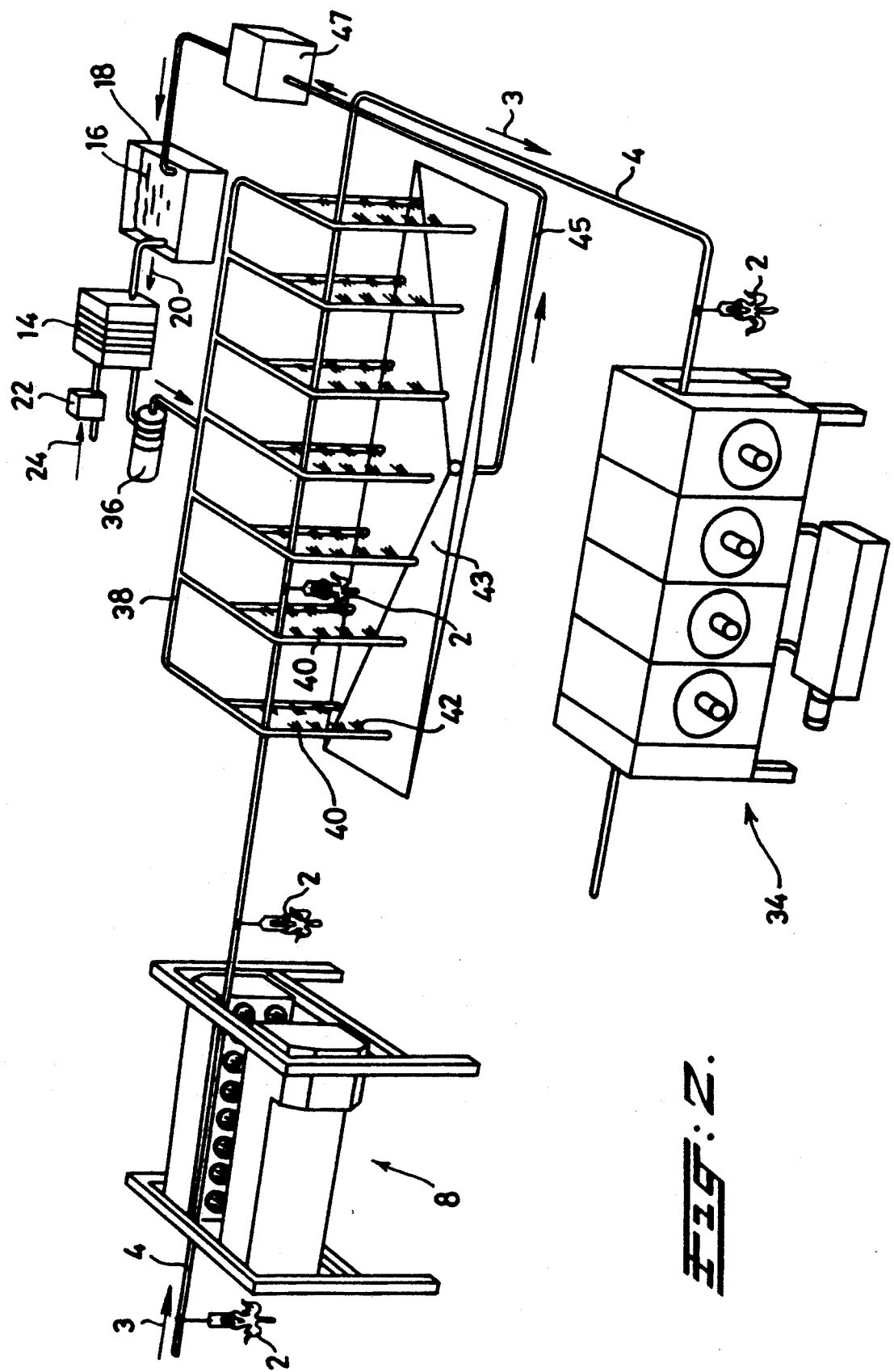
FIG. 2 shows a schematic perspective view of a second embodiment of a device for a washing treatment and a heat treatment.
Figure 3:
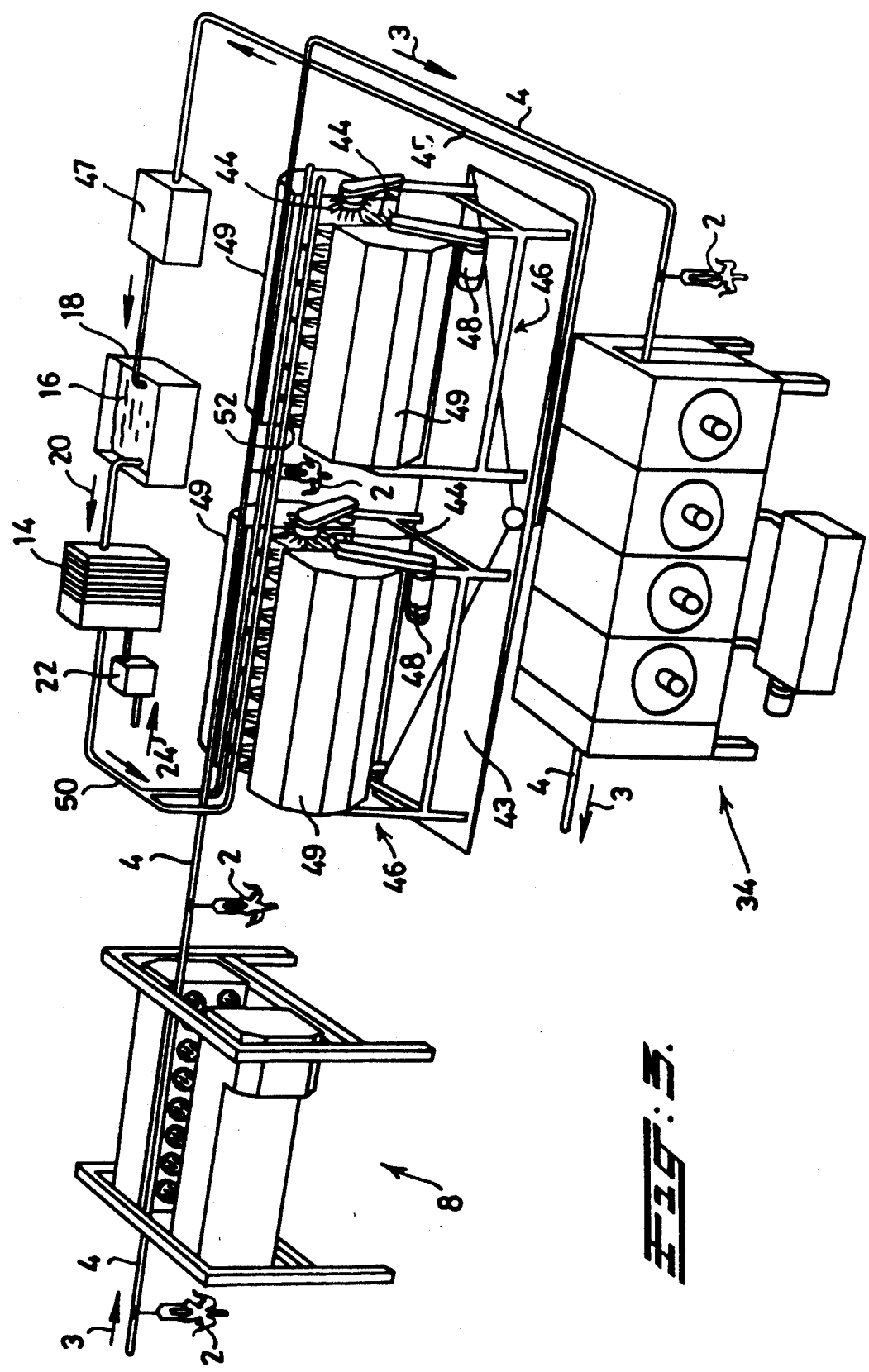
FIG. 3 shows a schematic perspective view of a first embodiment of a device for a brushing treatment of slaughtered poultry.

In FIGS. 2, 3 and 4 the same reference numerals as used in the other figures indicate similar parts and aspects of the device.

The acid solution prepared by the conditioning unit 14 shown in FIG. 2 is pumped through pump 36 to a pipeline system 38 forming portals 40 by means of which the poultry conveyed under conveyor line 4 can be sprayed from all sides with the acid solution distributed by spray nozzles 42. The contaminated acid solution is collected in collecting tray 43, drained through pipeline 45 to a cleaning unit 47 and recirculated to buffer tank 18.

In FIG. 3, the skin of the poultry 2 having left the plucking device 8 is "brushed" with horizontally rotating finisher 44 in two finishing devices 46 placed one after the other along the conveyor line 4. The finisher are driven by motors 48 and move in opposite direction to each other in housings 49. During the finishing treatment an acid solution flowing from the conditioning unit 14 is sprayed on the poultry carcasses from above and from the sides by means of a pipeline system 50 with spray nozzles 52 running parallel to the conveyor line 4.

The finisher 44 comprise smooth flexible rubber fingers, which are longer and are driven more slowly than the grooved rubber fingers usually used in the plucking device 8. The fingers move downwards along the poultry skin.

FIG. 4 only differs from FIG. 3 in the construction and the arrangement of the brushing elements. The brushes 54 are arranged in pairs at different angles to the conveyor line 4, each brush of each pair rotating in an opposite direction to the other one, as indicated by arrows. Every brush 54 consists of a holder with holes for hairs, each hole containing only one hair. The brushes either move in a downwards direction or in the conveying direction along the poultry skin.

The arrangement of the devices shown in FIGS. 1–4 is for illustration purposes only. Those skilled in the art may design various other arrangements without departing from the scope of the invention.

What is claimed is:

1. A method for removing, killing or bringing into a passive condition of bacteria on and in the skin of slaughtered, plucked poultry by a chemical, mechanical or temperature treatment, or a combination thereof, wherein the treatment(s) are effected after plucking of the poultry and prior to the opening of the carcass thereof, wherein said treatment(s) comprise subjecting the skin of the poultry to an acid treatment with an acid solution and a heat treatment at a temperature of about 50° C. for two to three minutes.

2. A method according to claim 1, wherein the poultry is immersed in or sprayed with water at the desired temperature, the water being mixed with an acid.

3. A method according to claim 2, wherein the poultry is immersed in various baths separated from each other.

4. A method according to claim 2, comprising a continuous or intermittent supply of a clean acid solution to a bath and a corresponding drainage of contaminated acid solution from the bath.

5. A method according to claim 4, wherein the solution in the bath is agitated during the treatment with mechanical means or by injection of a gas, liquid or the like in the bath.

6. A method according to claim 4, wherein the acid solution contains about 5 cm$^3$ lactic acid per liter of water such that the acid solution has a pH of about 2.3.

7. A method according to claim 2, wherein the water mixed with an acid is reused after cleaning thereof.

8. A method according to claim 1, wherein the skin of the poultry is brushed with rotating brushing elements, at the same time spraying a spraying liquid on the poultry from above and from the sides.

9. A method according to claim 8, wherein the spraying liquid used is reused as spraying liquid after cleaning thereof.

10. A method according to claim 9, wherein the spraying liquid consists of water mixed with an acid.

11. A method according to claim 8, wherein the spraying liquid consists of water mixed with an acid.

12. A method for removing, killing or bringing into a passive condition of bacteria on and in the skin of slaughtered, plucked poultry by a chemical, mechanical or temperature treatment, or a combination thereof, the treatment(s) being effected after final plucking of the poultry and prior to the opening of the carcass thereof, wherein said treatment(s) comprise subjecting the skin of the poultry to a heat treatment with heated water, for a time and at a temperature which is sufficient to remove, kill or bring into a passive condition of bacteria on and in the skin of the poultry.

13. A method according to claim 12, wherein the heat treatment is at a temperature of about 50° C. for two to three minutes.

14. A method according to claim 12, wherein the poultry is immersed in a bath of water at the desired temperature.

15. A method according to claim 14, wherein the poultry is immersed in a plurality of consecutive baths separated from each other.

16. A method according to claim 15, wherein the bath is agitated during the treatment with a means selected from the group consisting of mechanical means, injection of a gas into the bath, injection of a liquid into the bath, or injection of an agitating fluid into the bath.

17. A method according to claim 14, wherein the skin of the poultry is brushed with rotating brushing elements at the same time spraying a spraying liquid on the poultry from above and from the sides.

18. A method according to claim 12, wherein the poultry is sprayed with water at the desired temperature.

19. A method for removing, killing or bringing into a passive condition of bacteria on and in the skin of slaughtered, plucked poultry by a chemical, mechanical or temperature treatment, or a combination thereof, the treatment(s) being effected after plucking the poultry and prior to the opening of the carcass thereof, wherein said treatment(s) comprise subjecting the skin of the poultry to an acid treatment with an acid solution, under conditions sufficient to remove, kill or bring into a passive condition of bacteria on and in the skin of the poultry.

20. A method according to claim 19, wherein the acid solution has a pH value of about 2.3 and contains lactic acid.

21. A method according to claim 19, wherein the poultry is immersed in a bath containing an acid solution.

22. A method according to claim 21, wherein the poultry is immersed in a plurality of consecutive baths separated from each other.

23. A method according to claim 22, comprising a continuous or intermittent supply of clean acid solution to the bath and a corresponding drainage of contaminated acid solution from the bath.

24. A method according to claim 22, wherein the bath is agitated during the treatment with a means selected from the group consisting of mechanical means, injection of a gas into the bath, injection of a liquid into the bath, or injection of an agitating fluid into the bath.

25. A method according to claim 21, wherein the skin of the poultry is brushed with rotating brushing elements at the same time spraying a spraying liquid on the poultry from above and from the sides.

26. A method according to claim 19, wherein the poultry is sprayed with an acid solution.

27. A method according to claim 19, wherein the acid solution is reused after cleaning thereof.

28. A method for removing, killing or bringing into a passive condition of bacteria on and in the skin of slaughtered, plucked poultry by a chemical, mechanical or temperature treatment, or a combination thereof, the treatment(s) being effected after plucking of the poultry and prior to the opening of the carcass thereof, wherein said treatment(s) comprise subjecting the skin of the poultry to an acid treatment with an acid solution and a heat treatment with heated water, under conditions sufficient to remove, kill or bring into a passive condition of bacteria on and in the skin of the poultry.

29. A method according to claim 28, wherein the heat treatment is at a temperature of about 50° C. for two to three minutes.

30. A method according to claim 28, wherein the acid solution has a pH value of about 2.3 and contains lactic acid.

31. A method according to claim 28, wherein the poultry is immersed in a bath of water at the desired temperature, the water being mixed with an acid.

32. A method according to claim 31, wherein the poultry is immersed in a plurality of consecutive baths separated from each other.

33. A method according to claim 32, comprising a continuous of intermittent supply of a clean acid solution to a bath and a corresponding drainage of contaminated acid solution from the bath.

34. A method according to claim 32, wherein the bath is agitated during the treatment with a means selected from the group consisting of mechanical means, injection of a gas into the bath, injection of a liquid into the bath, or injection of an agitating fluid into the bath.

35. A method according to claim 31, wherein the skin of the poultry is brushed with rotating brushing elements at the same time spraying a spraying liquid on the poultry from above and from the sides.

36. A method according to claim 28, wherein the poultry is sprayed with water at the desired temperature, the water being mixed with an acid.

37. A method according to claim 28, wherein the acid solution is reused after cleaning thereof.

* * * * *